US012752663B2

(12) United States Patent
Ye et al.

(10) Patent No.: US 12,752,663 B2
(45) Date of Patent: Oct. 6, 2026

(54) APPARATUS AND METHOD FOR CONTROLLING A VEHICLE

(71) Applicants: HYUNDAI MOTOR COMPANY, Seoul (KR); KIA CORPORATION, Seoul (KR)

(72) Inventors: Kwang Hae Ye, Seoul (KR); Do Sung Kim, Seoul (KR); Young Hoon Kwon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 175 days.

(21) Appl. No.: 18/775,794

(22) Filed: Jul. 17, 2024

(65) Prior Publication Data

US 2025/0178478 A1 Jun. 5, 2025

(30) Foreign Application Priority Data

Nov. 30, 2023 (KR) ........................ 10-2023-0171462

(51) Int. Cl.
*B60L 58/14* (2019.01)
*B60L 1/00* (2006.01)

(52) U.S. Cl.
CPC ................. *B60L 58/14* (2019.02); *B60L 1/00* (2013.01)

(58) Field of Classification Search
None
See application file for complete search history.

(56) References Cited

U.S. PATENT DOCUMENTS

| | | | | |
|---|---|---|---|---|
| 10,291,054 | B2 * | 5/2019 | Watanabe | H02J 7/977 |
| 12,384,264 | B2 * | 8/2025 | Ma | B60L 53/22 |
| 2022/0324399 | A1 * | 10/2022 | Chen | B60R 16/03 |
| 2023/0202343 | A1 * | 6/2023 | Song | B60L 58/14 307/10.1 |

OTHER PUBLICATIONS

Machine translation of Tian et al CN 108638890 A (Year: 2018).*

* cited by examiner

*Primary Examiner* — Imran K Mustafa
*Assistant Examiner* — David Hatch
(74) *Attorney, Agent, or Firm* — Lempia Summerfield Katz LLC

(57) ABSTRACT

An apparatus for controlling a vehicle includes a sensor to determine whether to transmit a signal related to a recharging operation for a low voltage battery. The apparatus also includes a processor configured to determine whether to wake up, based on whether the signal related to the recharging operation for the low voltage battery is received and to determine whether to perform the recharging operation for the low voltage battery, in response to the signal related to the recharging operation for the low voltage battery when waking up.

20 Claims, 7 Drawing Sheets

APPARATUS AND METHOD FOR CONTROLLING A VEHICLE

CROSS-REFERENCE TO RELATED APPLICATION

This application claims the benefit of and priority to Korean Patent Application No. 10-2023-0171462, filed in the Korean Intellectual Property Office on Nov. 30, 2023, the entire contents of which are incorporated herein by reference.

TECHNICAL FIELD

The present disclosure relates to an apparatus and a method for controlling a vehicle and, more particularly, relates to an apparatus and a method for controlling a vehicle, capable of recharging an auxiliary battery using a high voltage battery.

BACKGROUND

An electric vehicle has a high voltage battery to provide power for driving a vehicle and has a low voltage battery to supply power to a controller and a convenience device. The high voltage battery is typically charged through an external power supply. The low voltage battery may be charged with power from the high voltage battery.

Whenever the state of charge (SOC) of the low voltage battery is less than the threshold value, and the charging decrement of the low voltage battery exceeds a reference value, a vehicle network wakes up for the recharging operation for the low voltage battery to turn on an IGN3 power (which is supplied to a charging circuit, a power supply, a convenience device, and a safety device using a large capacity of battery) to determine whether the SOC of the high voltage battery is a state for the recharging operation for the low voltage battery.

The above procedure has a limitation in merely consuming the power of the low voltage battery without the recharging operation for the low voltage battery. This is because the power of the low voltage battery is used whenever the vehicle network often wakes up to turn on the IGN3 power, when the SOC of the high voltage battery is not sufficient. The subject matter described in this background section is intended to promote an understanding of the background of the disclosure and thus may include subject matter that is not already known to those of ordinary skill in the art.

SUMMARY

The present disclosure has been made to solve the above-mentioned problems occurring in the prior art while advantages achieved by the prior art are maintained intact.

Aspects of the present disclosure provide an apparatus and a method for controlling a vehicle, capable of preventing unnecessary power consumption of a low voltage battery by preventing a vehicle network from unnecessarily waking up or preventing the IGN3 power from being controlled to be turned on, when the low voltage battery is recharged using a high voltage battery.

Other aspects of the present disclosure provide an apparatus and a method for controlling a vehicle, capable of performing an urgent recharging operation for a low voltage battery even if a SOC of the high voltage battery is not insufficient to recharge the low voltage battery. Thus, the minimum power required to start an engine of a vehicle is ensured, and the inconvenience of a user is minimized.

Other aspects of the present disclosure provide an apparatus and a method for controlling a vehicle, capable of informing a user of a situation in which a low voltage battery needs to be recharged with power and a high voltage battery needs to be charged with power, without recharging the low voltage battery depending on the charging state of the low voltage battery, when a SOC of the high voltage battery is not insufficient to recharge the low voltage battery. Thus, the user takes an action for charging a battery, and battery discharge is prevented.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, an apparatus for controlling a vehicle may include a sensor configured to acquire a state of charge (SOC) of a low voltage battery. The sensor may be configured to acquire an SOC of a high voltage battery when an IGN3 power is turned off. The sensor may be configured to compare the SOC of the high voltage battery with a second threshold value, when the SOC of the low voltage battery is equal to or less than a first threshold value, when a decrement of the low voltage battery exceeds a reference value. The sensor may be configured to determine whether to transmit a signal related to a recharging operation for the low voltage battery based on a comparison result. The apparatus may include a processor configured to determine whether to wake up, based on whether the signal related to the recharging operation for the low voltage battery is received. The processor may bes configured to determine whether to perform the recharging operation for the low voltage battery, in response to the signal related to the recharging operation for the low voltage battery when waking up.

According to an embodiment, the sensor may transmit, to the processor, a signal for a request for the recharging operation for the low voltage battery, which is included in the signal related to the recharging operation for the low voltage battery, when the SOC of the high voltage battery is equal to or greater than the second threshold value.

According to an embodiment, the processor may wake up when receiving the signal for request for the recharging operation for the low voltage battery, from the sensor. The processor may control to turn on the IGN3 power in response to the signal for request for the recharging operation for the low voltage battery, when waking up.

According to an embodiment, the processor may control to perform the recharging operation for the low voltage battery when turning on the IGN3 power in response to the signal for request for the recharging operation for the low voltage battery.

According to an embodiment, the sensor may determine whether to transmit, to the processor, the signal related to the recharging operation for the low voltage battery based on the SOC of the low voltage battery, when the SOC of the high voltage battery is less than the second threshold value.

According to an embodiment, the sensor may determine not to transmit, to the processor, a signal for a request for the recharging operation for the low voltage battery, which is included in the signal related to the recharging operation for the low voltage battery, when the SOC of the low voltage battery is in a first range equal to or less than the first threshold value.

According to an embodiment, the processor may maintain a sleep state, when failing to receive the signal for the request for the recharging operation for the low voltage battery, which is included in the signal related to the recharging operation for the low voltage battery.

According to an embodiment, the sensor may determine to transmit, to the processor, a user notification signal, which is included in the signal related to the recharging operation for the low voltage battery, when the SOC of the low voltage battery is in a second range less than a lower limit of the first range.

According to an embodiment, the processor may wake up when receiving the user notification signal from the sensor and may activate a connected car service in response to the user notification signal when waking up.

According to an embodiment, the processor may control to output an information message corresponding to the user notification signal through a connected car service, when the connected car service is activated.

According to an embodiment, the sensor may determine to transmit, to the processor, the user notification signal and a signal for a request for an urgent recharging operation of the low voltage battery, which are included in the signal related to the recharging operation for the low voltage battery, when the SOC of the low voltage battery is in a third range less than a lower limit of the second range.

According to an embodiment, the processor may wake up when receiving the user notification signal, and the signal for the request for the urgent recharging operation of the low voltage battery, from the sensor. The processor may activate a connected car service in response to the user notification signal, when waking up. The processor may control to turn on the IGN3 power in response to the signal for the request for the urgent recharging operation of the low voltage battery.

According to an embodiment, the processor may control to output an information message in response to the user notification signal, and to perform the urgent recharging operation for the low voltage battery, through the connected car service, when activating the connected car service and controlling to turn on the IGN3 power.

According to another aspect of the present disclosure, a method for controlling a vehicle may include acquiring an SOC of a low voltage battery. The method may include acquiring an SOC of a high voltage battery when an IGN3 power is turned off. The method may include comparing the SOC of the high voltage battery with a second threshold value, when the SOC of the low voltage battery is equal to or less than a first threshold value, when a decrement of the low voltage battery exceeds a reference value. The method may include transmitting, to a processor, a signal related to a recharging operation for the low voltage battery based on a comparison result. The method may include determining whether the processor wakes up, depending on whether the signal related to the recharging operation for the low voltage battery is received. The method may include determining whether to perform the recharging operation of the low voltage battery in response to the signal related to the recharging operation for the low voltage battery, which is received when the processor wakes up.

According to an embodiment, the method may further include transmitting, to the processor, a signal for a request for the recharging operation for the low voltage battery, which is included in the signal related to the recharging operation for the low voltage battery, when the SOC of the high voltage battery is equal to or greater than the second threshold value.

According to an embodiment, the method may further include waking up, by the processor, when receiving the signal for request for the recharging operation for the low voltage battery. The method may further include controlling to turn on the IGN3 power in response to the signal for request for the recharging operation for the low voltage battery, when waking up.

According to an embodiment, the method may further include controlling, by the processor, to perform the recharging operation for the low voltage battery, when turning on the IGN3 power in response to the signal for request for the recharging operation for the low voltage battery.

According to an embodiment, the method may further include transmitting, to the processor, the signal related to the recharging operation for the low voltage battery depending on the SOC of the low voltage battery, when the SOC of the high voltage battery is less than the second threshold value.

According to an embodiment, the method may further include determining not to transmit, to the processor, a signal for a request for the recharging operation for the low voltage battery, which is included in the signal related to the recharging operation for the low voltage battery, when the SOC of the low voltage battery is in a first range equal to or less than the first threshold value.

According to an embodiment, the method may further include maintaining, by the processor, a sleep state, when failing to receive the signal for the request for the recharging operation for the low voltage battery, which is included in the signal related to the recharging operation for the low voltage battery.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
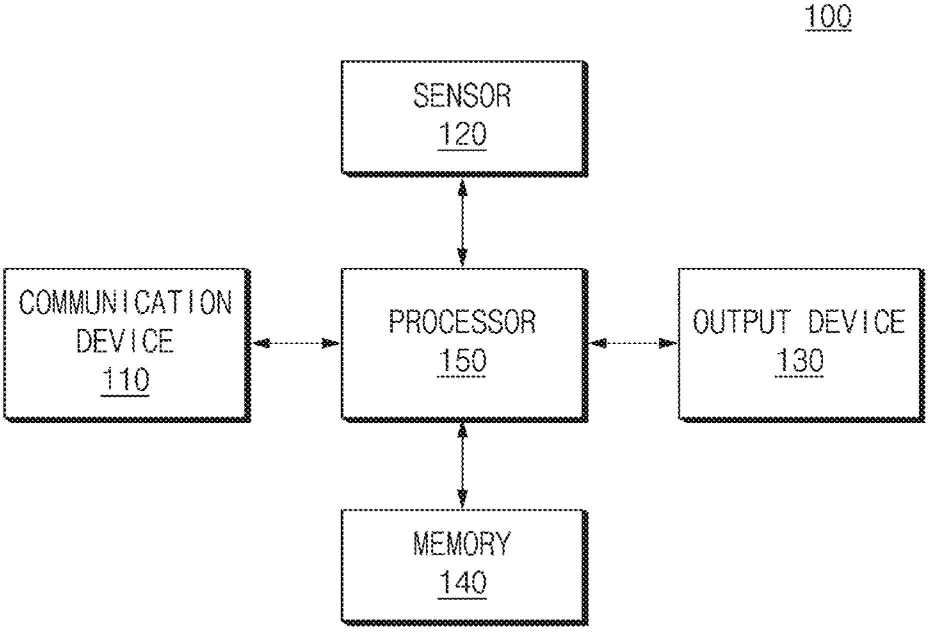
FIG. 1 is a view illustrating the configuration of an apparatus for controlling a vehicle, according to an embodiment of the present disclosure.

Hereinafter, embodiments of the present disclosure are described in detail with reference to accompanying drawings. In adding the reference numerals to the components of each drawing, it should be noted that the identical or equivalent components are designated by the identical numeral even when the components are displayed on different drawings. In addition, in the following description of embodiments of the present disclosure, a detailed description of well-known features or functions has been omitted in order not to unnecessarily obscure the gist of the present disclosure.

In describing the components of the embodiment according to the present disclosure, terms such as first, second, "A", "B", "(a)", "(b)", and the like may be used. These terms are merely intended to distinguish one component from another component, and the terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings consistent with the contextual meanings in the relevant field of art. Such terms should not to be interpreted as having ideal or excessively formal meanings unless clearly defined as having such in the present disclosure. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

FIG. 1 is a view illustrating the configuration of an apparatus (hereinafter, a vehicle control device) for controlling a vehicle, according to an embodiment of the present disclosure.

As illustrated in FIG. 1, a vehicle control device 100 may include a communication device 110, a sensor 120, an output device 130, a memory 140, and a processor 150.

The communication device 110 may make wireless communication with another vehicle or a user terminal through vehicle to vehicle (V2V) communication or vehicle to something (V2X) communication to provide a connected car service. According to an embodiment, the communication device 110 may include a transceiver, a communication circuit, and a communication processor to transmit and receive information using an antenna The sensor 120 may include an intelligent battery sensor (IBS) to acquire information about the state of a lower voltage battery (12 V battery). According to an embodiment, the sensor 120 may acquire a current, a voltage, or a temperature of the low voltage battery in real time, may calculate a state of charge (SOC) of the low voltage battery, and may transmit the information about the state of the low voltage battery to the processor 150, when implemented using the IBS. According to an embodiment, the IBS may include a controller (micro controller) to calculate the SOC of the low voltage battery and determine whether to transmit a signal related to a recharging operation for the low voltage battery. The sensor 120 may also include a local internet network (LIN) communication device to transmit the information about the SOC of the low voltage battery, which is acquired by the controller, to the processor 150. The sensor 120 may also include a memory to temporarily store information (an SOC of a high voltage battery) received from the processor 150.

The output device 130 may output an image or a sound under the control of the processor 150. According to an embodiment, the output device 130 may be implemented using a display device or a sound output device. In this case, the display device may include a head up display (HUD) or cluster. According to an embodiment, the display device may be implemented with a display that employs a liquid crystal display (LCD) panel, a light emitting diode (LED) panel, an organic light emitting diode (OLED) panel, or a plasma display panel (PDP). The LCD may include a thin film transistor-LCD (TFT-LCD). The display device may be integrally implemented through a touch screen panel (TSP)

The memory 140 may store at least one algorithm to compute or execute various instructions for the operation of the vehicle control device according to an embodiment of the present disclosure. According to an embodiment, the memory 140 may store at least one instruction executed by the processor 150, and the instruction may allow the vehicle control device to operate according to an embodiment. The memory 150 may include at least one storage medium of at least one a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The processor 150 may be implemented by various processing devices, such as a microprocessor embedded therein with a semiconductor chip to operate or execute various instructions and may control the vehicle control device according to an embodiment. The processor 150 may be electrically connected to the communication device 110, the sensor 120, the output device 130, and the memory 140 through a wired cable or various circuits to transmit an electrical signal including a control command to execute an arithmetic operation or data processing related to a control operation and/or communication. The processor 150 may include at least one of a central processing unit, an application processor, a communication processor (CP), or any combination thereof. The details are described with reference to FIG. 2.

Figure 2:
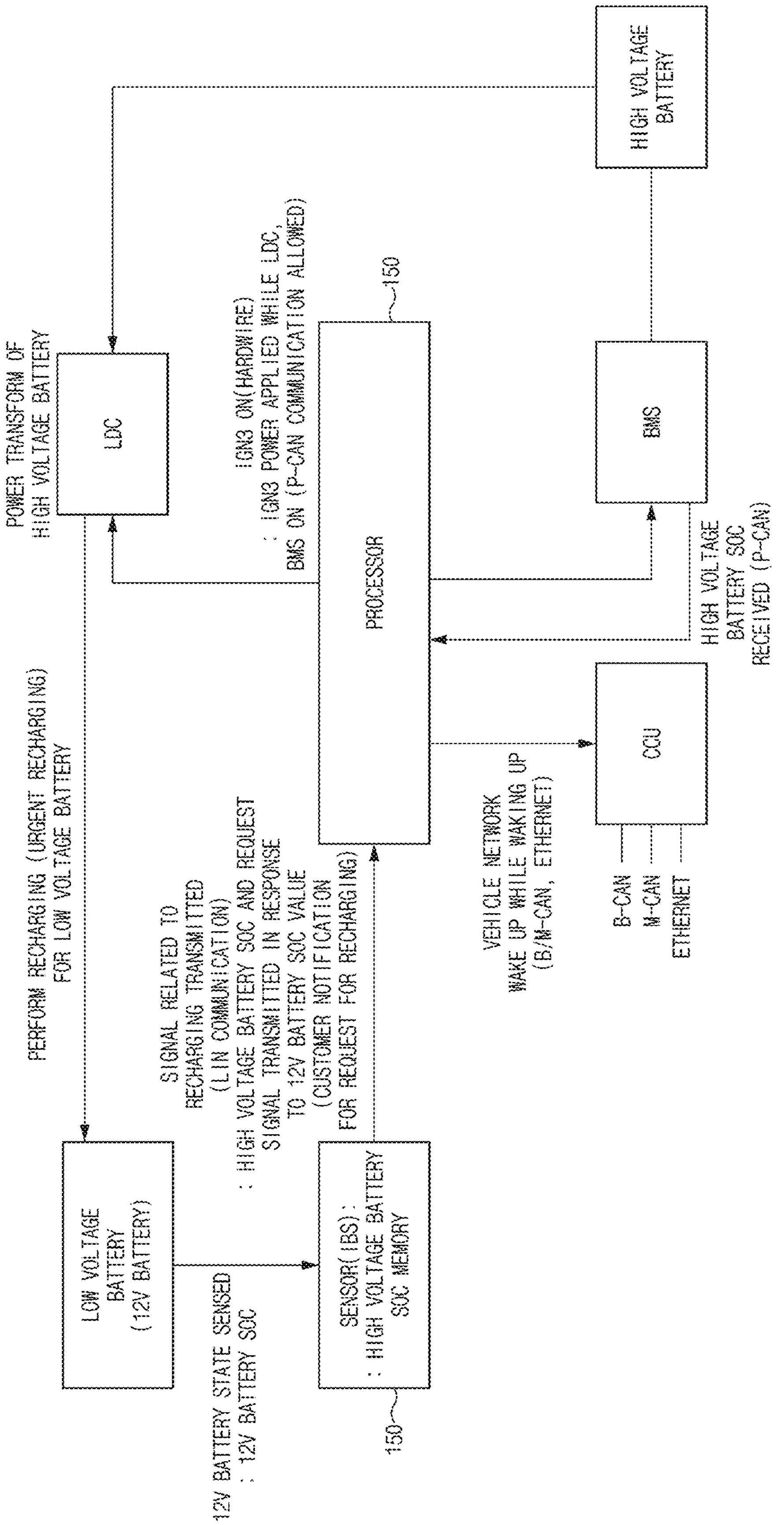
FIG. 2 is a view schematically illustrating the operation of an apparatus for controlling a vehicle, according to an embodiment of the present disclosure.

FIG. 2 is a view illustrating the operation of an apparatus (a vehicle control device) for controlling a vehicle, according to an embodiment of the present disclosure.

As illustrated in FIG. 2, the sensor 120 may acquire the state of the low voltage battery. According to an embodiment, the sensor 120 may acquire the SOC of the low voltage battery and the SOC of the high voltage battery when an IGN3 power is turned off. The sensor 120 may store the SOC of the high voltage battery when acquiring the SOC of the high voltage battery. In this case, the IGN3 power is controlled to be turned on for the recharging operation (urgent recharging operation) for the low voltage battery, and the IGN3 power is controlled to be turned on using the power the low voltage battery.

According to an embodiment, the sensor 120 may transmit, through LIN communication, a signal related to the recharging operation for the low voltage battery, based on a charging amount of the low voltage battery resulting from the charging amount of the high voltage battery, which is stored in the sensor 120 to processor 150. In this case, the signal related to the recharging operation for the low voltage battery may include a signal for a request for the recharging operation for the low voltage battery, a user notification signal for informing that the recharging operation for the low voltage battery is required, and a signal for a request for an urgent recharging operation for the low voltage battery.

According to an embodiment, the processor 150 may wake up when receiving the signal related to the recharging operation for the low voltage battery from the sensor 120. The processor 150 may wake up a vehicle network (e.g., CAN or Ethernet), when waking up.

According to an embodiment, the processor 150 does not wake up when failing to receive the signal related to the recharging operation for the low voltage battery from the sensor 120. Accordingly, the processor 150 may not perform the recharging operation for the low voltage battery.

According to an embodiment, when waking up the vehicle network, the processor 150 may wake up a controller to make communication through the CAN or the Ethernet and may determine whether to control to turn on the IGN3 power, based on the signal related to the recharging operation for the low voltage battery or the SOC of the high voltage battery.

According to an embodiment, the processor 150 may control to turn on the IGN3 power, when receiving the signal for the request for the recharging operation for the low voltage battery from the sensor 120.

According to an embodiment, the processor 150 may control to turn on the IGN3 power, when receiving the signal for the request for the urgent recharging operation for the low voltage battery from the sensor 120.

According to an embodiment, when receiving only the user notification signal for informing that the recharging operation for the low voltage battery is required, from the sensor 120, the processor 150 does not control to turn on the IGN3 power, does not perform the recharging operation for the low voltage battery, may activate a function of the connected car service, and may output an information message corresponding to the user notification signal through the connected car service.

According to an embodiment, the processor 150 may control to turn on a low DC-DC converter (LDC) and a battery management system (BMS) and may perform the recharging operation (urgent recharging operation) for the low voltage battery, when controlling to turn on the IGN3 power.

According to an embodiment, the processor 150 may perform the recharging operation for the low voltage battery, when receiving the signal for the request for the recharging operation for the low voltage battery from the sensor 120 and when controlling to turn on the IGN3 power.

According to an embodiment, the processor 150 may perform the urgent recharging operation for the low voltage battery, when receiving the signal for the request for the urgent recharging operation for the low voltage battery from the sensor 120 and when controlling to turn on the IGN3 power. According to an embodiment, the processor 150 may ensure the minimum power required to control to turn on a vehicle engine through the urgent recharging operation for the low voltage battery.

According to an embodiment, the processor 150 may control to perform the recharging operation (the urgent recharging operation) for the low voltage battery by converting a high voltage DC to a low voltage DC using the LDC.

According to an embodiment, the processor 150 may receive the SOC of the high voltage battery from the high voltage battery and may transmit, to the sensor 120, the SOC of the high voltage battery when controlling to turn off the IGN3 power.

According to an embodiment, the sensor 120 may transmit, to the processor 150, the signal related to the recharging operation for the low voltage battery based on the charging amount of the high voltage battery, when the charging amount of the low voltage battery is equal to or less than a first threshold value (e.g., 80%), and when the charging consumption amount (discharging amount) of the low voltage battery exceeds a reference value (e.g., 5%). The processor 150 may determine whether to perform the recharging operation for the low voltage battery, based on the signal related to the recharging operation for the low voltage battery, which is received from the sensor 120. Hereinafter, the detailed description is made with reference to FIGS. 3 and 4 regarding an operation related to the recharging operation for the low voltage battery performed based on the SOC of the high voltage battery at a time point at which the IGN3 power is controlled to be turned off.

Figure 3:
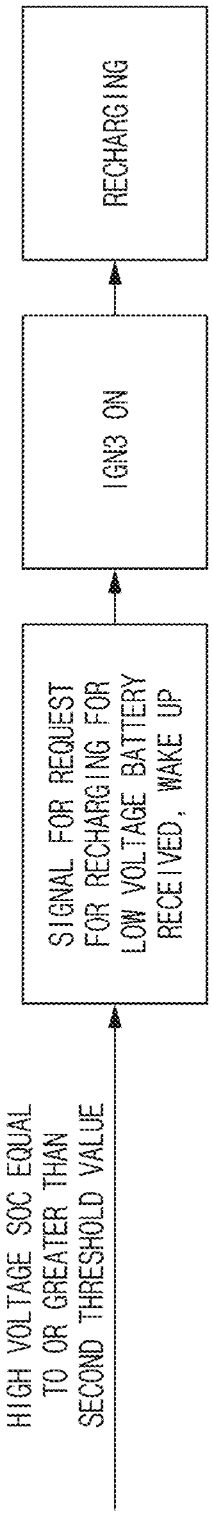
FIG. 3 is a view schematically illustrating the operation related to a recharging operation of a low voltage battery when a state of charge (SOC) of the high voltage battery is equal to or greater than a second threshold value, according to an embodiment of the present disclosure.

FIG. 3 is a view schematically illustrating the operation related to the recharging operation for the low voltage battery when the SOC of the high voltage battery is equal to or greater than a second threshold value, according to an embodiment of the present disclosure.

As illustrated in FIG. 3, according to an embodiment, the sensor 120 may transmit, to the processor 150, the signal for the request for the recharging operation for the low voltage battery, when the SOC of the low voltage battery is equal to or less than the first threshold value (e.g., 80%), when charging decrement of the low voltage battery exceeds a reference value (e.g., 5%), and when the SOC of the high voltage battery is equal to or greater than the second threshold value (e.g., 10%) at the time point at which the IGN3 power is controlled to be turned off.

According to an embodiment, the processor 150 may wake up when receiving the signal for the request for the recharging operation for the low voltage battery from the sensor 120.

The processor 150 may control to turn on the IGN3 power when waking up. According to an embodiment, the processor 150 may control to turn on the BMS and the LDC to perform the recharging operation of the low voltage battery, when the IGN3 power is controlled to be turned on.

Figure 4:
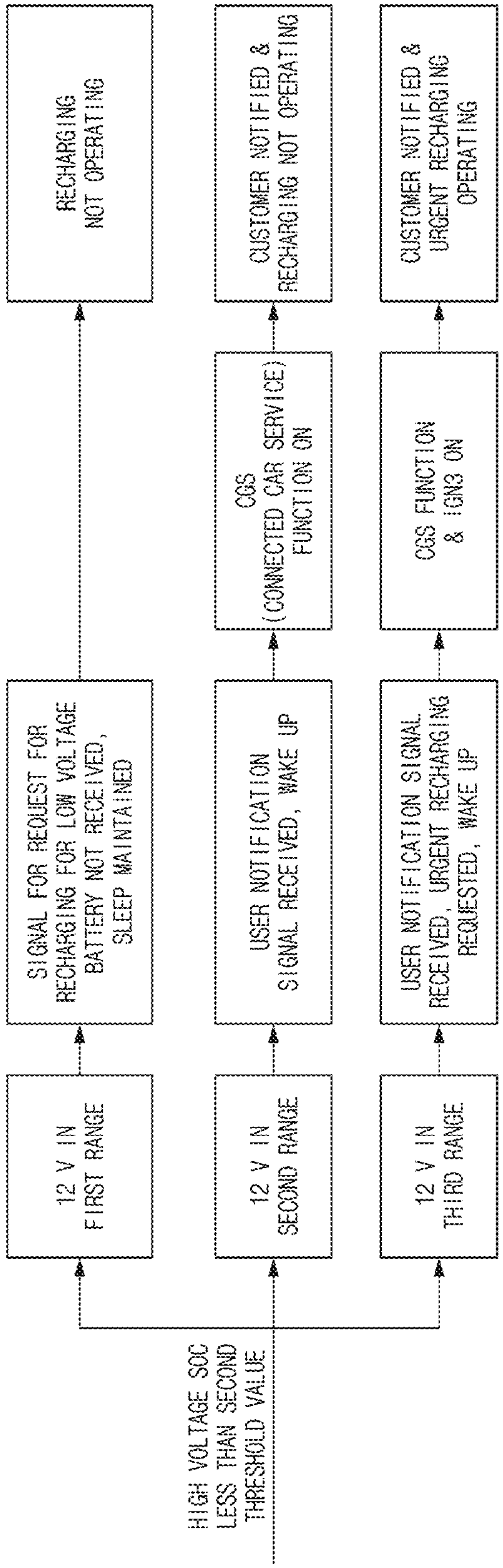
FIG. 4 is a view schematically illustrating the operation related to a recharging operation of a low voltage battery when an SOC of the high voltage battery is equal to or greater than a second threshold value, according to an embodiment of the present disclosure.

FIG. 4 is a view schematically illustrating the operation related to the recharging operation for the low voltage battery when the SOC of the high voltage battery is less than a second threshold value, according to an embodiment of the present disclosure.

As illustrated in FIG. 4, according to an embodiment, the sensor 120 may transmit, to the processor 150, the signal related to the recharging operation for the low voltage battery based on the SOC of the low voltage battery, when the SOC of the low voltage battery is equal to or less than the first threshold value (e.g., 80%), when charging decrement of the low voltage battery exceeds the reference value (e.g., 5%), and when the SOC of the high voltage battery is less than the second threshold value (e.g., 10%) at the time point at which the IGN3 power is controlled to be turned off.

According to an embodiment, the sensor 120 may determine whether the SOC of the low voltage battery is sensed within a first range equal to or less than the first threshold value. In this case, the first range may include a range from 60% to 80% in the SOC of the low voltage battery.

According to an embodiment, the sensor 120 may not transmit, to the processor 150, the signal for the request for the recharging operation for the low voltage battery, which is included in the signal related to the recharging operation for the low voltage battery, when the SOC of the low voltage battery is determined as being sensed in the first range equal to or less than the first threshold value.

According to an embodiment, the processor 150 may maintain a sleep state, when failing to receive the signal for the request for the recharging operation for the low voltage battery, which is included in the signal related to the recharging operation for the low voltage battery. According to an embodiment, the processor 150 may not perform the recharging operation for the low voltage battery because the sleep state is maintained.

According to an embodiment, the sensor 120 may determine whether the SOC of the low voltage battery is sensed in a second range less than the lower limit value of the first range, when the SOC of the low voltage battery is determined not be sensed in the first range equal to or less than the first threshold value. In this case, the second range may include a range from 40% to less than 60% in the SOC of the low voltage battery.

According to an embodiment, the sensor 120 may not transmit, to the processor 150, the user notification signal, which is included in the signal related to the recharging operation for the low voltage battery, when the SOC of the low voltage battery is determined as being sensed in the second range.

According to an embodiment, the processor 150 may wake up when receiving the user notification signal from the sensor 120. The processor 150 may activate the connected car service in response to the user notification signal, when waking up.

According to an embodiment, the processor 150 may control to output an information message corresponding to the user notification signal through at least one of the output deice 130, the user terminal, or any combination thereof, through the connected car service. According to an embodiment, the processor 150 may output the message for informing that the recharging operation for the low voltage battery is required, through at least one of the output device 130, the user terminal, or any combination thereof.

According to an embodiment, the processor 150 receives only the user notification signal, when the SOC of the low voltage battery is included in the second range. Accordingly, the processor 150 may prevent the recharging operation for the low voltage battery from being controlled. For example, the processor 150 may prevent the operation for controlling to turn on the IGN3 power to perform the recharging operation for the low voltage battery.

According to an embodiment, the sensor 120 may determine whether the SOC of the low voltage battery is sensed in a third range less than the lower limit value of the second range, when the SOC of the low voltage battery is determined not be sensed in the second range less than the lower limit value of the first range. In this case, the third range may include a range from more than 30% to less than 40% in the SOC of the low voltage battery.

According to an embodiment, the sensor 120 may not transmit, to the processor 150, the user notification signal and the signal for the request for the urgent recharging operation for the low voltage battery, which are included in the signal related to the recharging operation for the low voltage battery, when the SOC of the low voltage battery is determined as being sensed in the third range.

According to an embodiment, the processor 150 may wake up when receiving the user notification signal and the signal for the request for the urgent recharging operation for the low voltage battery from the sensor 120.

According to an embodiment, the processor 150 may activate the connected car service in response to receiving the user notification signal and may control to turn on the IGN3 power in response to the signal for the urgent request for the recharging operation for the low voltage battery, when waking up.

According to an embodiment, the processor 150 may control to output the user notification signal for informing that the recharging operation for the low voltage battery is required, through at least one of the output device 130, the user terminal or any combination thereof through the connected car service. The processor 150 may control to perform the urgent recharging operation for the low voltage battery. According to an embodiment, the processor 150 may ensure the minimum power required to control to turn on the vehicle engine through the urgent recharging operation for the low voltage battery.

Figure 5:
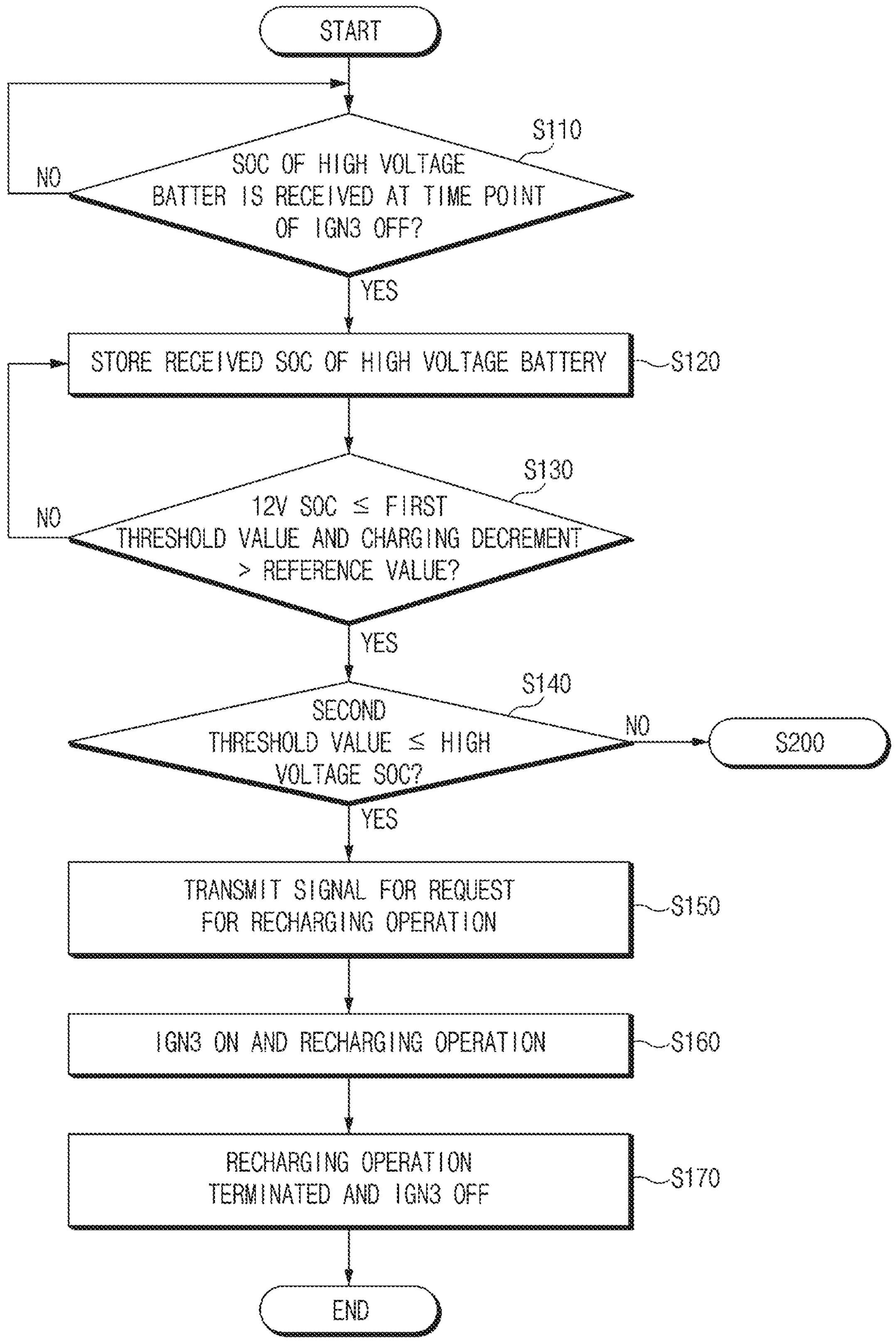
FIGS. 5 and 6 are flowcharts illustrating a method for controlling a vehicle, according to an embodiment of the present disclosure.
Figure 6:
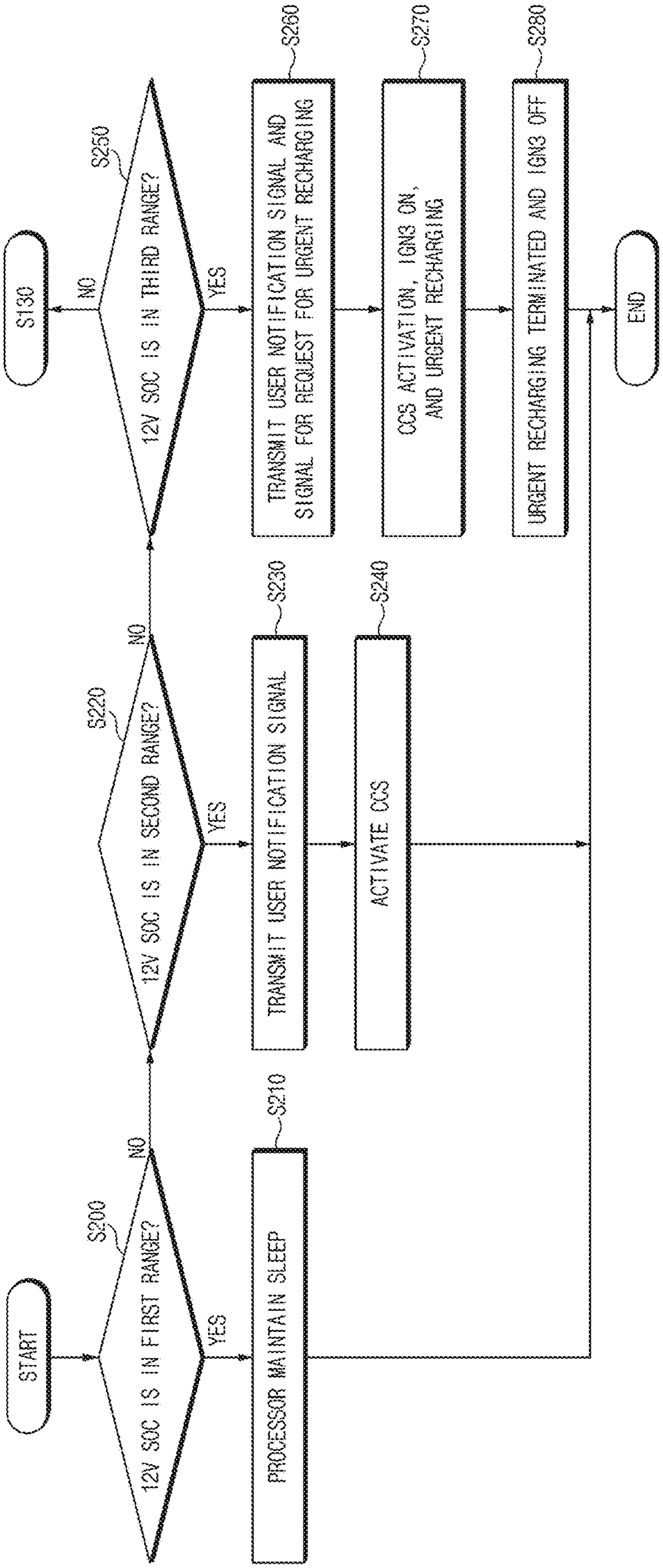

FIGS. 5 and 6 are flowcharts illustrating a method for controlling a vehicle, according to an embodiment of the present disclosure.

As illustrated in FIG. 5, the sensor 120 may determine whether the SOC of the high voltage battery is received at the time point at which the IGN3 power is controlled to be turned off (S110).

According to an embodiment, the sensor 120 may store the SOC of the high voltage battery (S120), when receiving the SOC of the high voltage battery at the time point at which the IGN3 power is controlled to be turned off (YES in S110).

According to an embodiment, the sensor 120 may determine whether the SOC of the low voltage battery is equal to or less than the first threshold value (e.g., 80%), and whether the charging decrement of the low voltage battery exceeds the reference value (e.g., 5%) (S130).

The sensor 120 may determine whether the SOC of the high voltage battery is equal to or greater than the second threshold value (e.g., 10%) (S140), when the SOC of the low voltage battery is equal to or less than a first threshold value (e.g., 80%), and when charging decrement of the low voltage battery exceeds the reference value (e.g., 5%) at the time point at which the IGN3 power is controlled to be turned off (YES in S130).

As illustrated in FIG. 3, according to an embodiment, the sensor 120 may transmit, to the processor 150, the signal for the request for the recharging operation for the low voltage battery (S150), when the SOC of the low voltage battery is equal to or less than the first threshold value (e.g., 80%), when the charging decrement of the low voltage battery exceeds the reference value (e.g., 5%), and when the SOC of the high voltage battery is equal to or greater than the second threshold value (e.g., 10%) at the time point at which the IGN3 power is controlled to be turned off (YES in S140).

According to an embodiment, the processor 150 may wake up when receiving the signal for the request for the recharging operation for the low voltage battery from the sensor 120. The processor 150 may control to turn on the IGN3 power when waking up (S160). According to an embodiment, in S160, the processor 150 may control to turn on the BMS and the LDC to perform the recharging operation for the low voltage battery, when the IGN3 power is controlled to be turned on.

The processor 150 may control to turn off the IGN3 power when the recharging operation for the low voltage battery is completed (S170). In S170, according to an embodiment, the processor 150 may acquire the voltage of the high voltage battery at the time point at which the IGN3 power is turned off, and the processor 150 may transmit, to the sensor 120, the voltage of the high voltage battery at the time point at which the IGN3 power is turned off.

Meanwhile, in S140, the processor 150 may perform S200, when the SOC of the low voltage battery is equal to or less than the first threshold value (e.g., 80%), when the charging decrement (e.g., 5%) of the low voltage battery exceeds the reference value, and when the SOC of the high voltage battery at the time point at which the IGN3 power is controlled to be turned off is not equal to or greater than (i.e., less than) the second threshold value (e.g., 10%) (NO in S140). The operation after S200 is described with reference to FIG. 6.

As illustrated in FIG. 6, according to an embodiment, the sensor 120 may transmit, to the processor 150, the signal related to the recharging operation for the low voltage battery based on the SOC of the low voltage battery, when the SOC of the low voltage battery is equal to or less than the first threshold value (e.g., 80%), when charging decrement of the low voltage battery exceeds the reference value (e.g., 5%), when the SOC of the high voltage battery is less than the second threshold value (e.g., 10%) at the time point at which the IGN3 power is controlled to be turned off.

According to an embodiment, the sensor 120 may determine whether the SOC of the low voltage battery is sensed within a first range equal to or less than the first threshold value (S200) In this case, the first range may include a range from 60% to 80% in the SOC of the low voltage battery.

According to an embodiment, the sensor 120 may not transmit, to the processor 150, the signal for the request for the recharging operation for the low voltage battery, which is included in the signal related to the recharging operation for the low voltage battery, when the SOC of the low voltage battery is determined as being sensed in the first range equal to or less than the first threshold value (YES in S200). According to an embodiment, the processor 150 may maintain a sleep state (S210), when failing to receive the signal for the request for the recharging operation for the low voltage battery, which is included in the signal related to the recharging operation for the low voltage battery. According to an embodiment, the processor 150 may not perform the recharging operation for the low voltage battery because the sleep state is maintained.

According to an embodiment, the sensor 120 may determine that the SOC of the low voltage battery is sensed in the second range less than the lower limit value of the first range (S220), when the SOC of the low voltage battery is determined not be sensed in the first range (NO in S200). In this case, the second range may include a range from 40% to less than 60% in the SOC of the low voltage battery.

According to an embodiment, the sensor 120 may transmit, to the processor 150, the user notification signal, which is included in the signal related to the recharging operation for the low voltage battery (S230), when the SOC of the low voltage battery is sensed as being included in the second range (YES in S220).

According to an embodiment, the processor 150 may wake up when receiving the user notification signal from the sensor 120. The processor 150 may activate the connected car service (CCS) in response to the user notification signal, when waking up (S240).

According to an embodiment, the processor 150 may control to output an information message corresponding to the user notification signal through at least one of the output deice 130, the user terminal, or any combination thereof, through the connected car service. According to an embodiment, the processor 150 may output the message for informing that the recharging operation for the low voltage battery is required, to at least one of the output deice 130, the user terminal, or any combination thereof.

According to an embodiment, the processor 150 receives only the user notification signal, when the SOC of the low voltage battery is included in the second range. Accordingly, the processor 150 may prevent the operation for the recharging operation for the low voltage battery from being controlled. For example, the processor 150 may prevent the IGN3 power from being controlled to be turned on for the recharging operation for the low voltage battery.

According to an embodiment, the sensor 120 may determine whether the SOC of the low voltage battery is sensed in a third range less than the lower limit value of the second range (S250), when the SOC of the low voltage battery is determined not be sensed in the second range less than the lower limit value of the first range (NO in S220). In this case, the third range may include a range from more than 0% or less than 40% in the SOC of the low voltage battery.

According to an embodiment, the sensor 120 may transmit, to the processor 150, the user notification signal and the signal for the request for the urgent recharging operation for the low voltage battery, which are included in the signal related to the recharging operation for the low voltage battery (S260), when the SOC of the low voltage battery is sensed as being included in the third range (YES in S250).

According to an embodiment, the processor 150 may wake up when receiving the user notification signal and the signal for the request for the recharging operation for the low voltage battery from the sensor 120.

According to an embodiment, the processor 150 may activate the connected car service in response to receiving the user notification signal and may control to turn on the IGN3 power in response to the signal for the request for the recharging operation for the low voltage battery, when waking up (S270).

According to an embodiment, the processor 150 may control to output the user notification signal for informing that the recharging operation for the low voltage battery is required, through at least one of the output device 130, the user terminal or any combination thereof through the connected car service. The processor 150 may control to perform the urgent recharging operation for the low voltage battery. According to an embodiment, the processor 150 may ensure the minimum power required to control to turn on the vehicle engine through the urgent recharging operation for the low voltage battery.

The processor 150 may control to turn off the IGN3 power when the urgent recharging operation for the low voltage battery is completed (S280). In S280, according to an embodiment, the processor 150 may acquire the voltage of the high voltage battery at the time point at which the IGN3 power is turned off, and may transmit, to the sensor 120, the voltage of the high voltage battery at the time point which the acquired IGN3 power is turned off.

Figure 7:
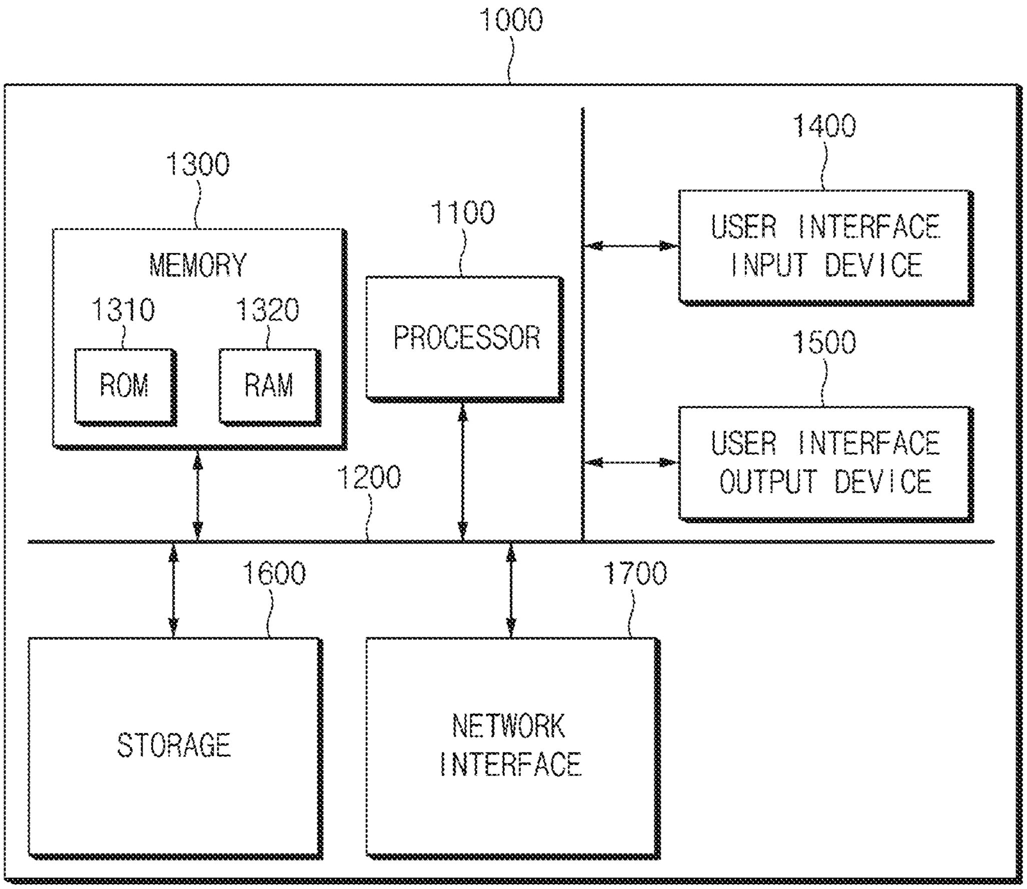
FIG. 7 is a view illustrating the configuration of a computing system to execute a method according to an embodiment of the present disclosure.

FIG. 7 is a view illustrating the configuration of a computing system to execute a method according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or any combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the apparatus and the method for controlling the vehicle, the unnecessary power consumption of a low voltage battery may be prevented by preventing the vehicle network from unnecessarily waking up or preventing the IGN3 power from being controlled to be turned on, when the low voltage battery is recharged using a high voltage battery.

According to an embodiment of the present disclosure, in the apparatus and the method for controlling the vehicle, the urgent recharging operation for the low voltage battery may be performed even if the SOC of the high voltage battery is not insufficient to recharge the low voltage battery, such that the minimum power required to start the engine of the vehicle is ensured, and the inconvenience of a user is minimized.

According to an embodiment of the present disclosure, in the apparatus and the method for controlling the vehicle, the user may be informed of the situation in which the low voltage battery needs to be recharged with power and the high voltage battery needs to be charged with power, without recharging the low voltage battery based on the charging state of the low voltage battery, when the SOC of the high voltage battery is not insufficient to recharge the low voltage battery, Thus, the user takes an action for charging the battery, and battery discharge is prevented.

The above description is merely an example of the technical idea of the present disclosure, and various modifications and modifications may be made by one having ordinary skill in the art without departing from the essential characteristic of the present disclosure.

Therefore, the embodiments of the present disclosure are provided to explain the spirit and scope of the present disclosure but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

Hereinabove, although the present disclosure has been described with reference to embodiments and the accompanying drawings, the present disclosure is not limited thereto but may be variously modified and altered by those having ordinary skill in the art to which the present disclosure pertains without departing from the spirit and scope of the present disclosure claimed in the following claims.

What is claimed is:

1. An apparatus for controlling a vehicle, the apparatus comprising:
- a sensor configured to
  - acquire a state of charge (SOC) of a low voltage battery,
  - acquire an SOC of a high voltage battery when an IGN3 power is turned off,
  - compare the SOC of the high voltage battery with a second threshold value, when the SOC of the low voltage battery is equal to or less than a first threshold value, and a decrement of the low voltage battery exceeds a reference value, and
  - transmit a signal related to a recharging operation for the low voltage battery based on a comparison result; and
- a processor configured to
  - wake up, based on the signal related to the recharging operation for the low voltage battery being received, and
  - control to perform the recharging operation for the low voltage battery, in response to the signal related to the recharging operation for the low voltage battery when waking up.

2. The apparatus of claim 1, wherein the sensor is configured to transmit, to the processor,
- a signal for a request for the recharging operation for the low voltage battery, which is included in the signal related to the recharging operation for the low voltage battery, when the SOC of the high voltage battery is equal to or greater than the second threshold value.

3. The apparatus of claim 2, wherein the processor is configured to:
- wake up when receiving the signal for request for the recharging operation for the low voltage battery, from the sensor, and
- control to turn on the IGN3 power in response to the signal for request for the recharging operation for the low voltage battery, when waking up.

4. The apparatus of claim 3, wherein the processor is configured to:
- control to perform the recharging operation for the low voltage battery when turning on the IGN3 power in response to the signal for request for the recharging operation for the low voltage battery.

5. The apparatus of claim 1, wherein the sensor is configured to determine whether to transmit, to the processor, the signal related to the recharging operation for the low voltage battery based on the SOC of the low voltage battery, when the SOC of the high voltage battery is less than the second threshold value.

6. The apparatus of claim 5, wherein the sensor is configured to determine not to transmit, to the processor, a signal for a request for the recharging operation for the low voltage battery, which is included in the signal related to the recharging operation for the low voltage battery, when the SOC of the low voltage battery is in a first range equal to or less than the first threshold value.

7. The apparatus of claim 6, wherein the processor is configured to:
- maintain a sleep state, when failing to receive the signal for the request for the recharging operation for the low voltage battery, which is included in the signal related to the recharging operation for the low voltage battery.

8. The apparatus of claim 6, wherein the sensor is configured to determine to transmit, to the processor, a user notification signal, which is included in the signal related to the recharging operation for the low voltage battery, when the SOC of the low voltage battery is in a second range less than a lower limit of the first range.

9. The apparatus of claim 8, wherein the processor is configured to:
- wake up when receiving the user notification signal from the sensor; and activate a connected car service in response to the user notification signal when waking up.

10. The apparatus of claim 9, wherein the processor is configured to:

control to output an information message corresponding to the user notification signal through a connected car service, when the connected car service is activated.

11. The apparatus of claim 8, wherein the sensor determines to transmit, to the processor, the user notification signal, and a signal for a request for an urgent recharging operation of the low voltage battery, which are included in the signal related to the recharging operation for the low voltage battery, when the SOC of the low voltage battery is in a third range less than a lower limit of the second range.

12. The apparatus of claim 11, wherein the processor is configured to:

wake up when receiving the user notification signal, and the signal for the request for the urgent recharging operation of the low voltage battery, from the sensor;

activate a connected car service in response to the user notification signal, when waking up; and control to turn on the IGN3 power in response to the signal for the request for the urgent recharging operation of the low voltage battery.

13. The apparatus of claim 12, wherein the processor is configured to:

control to output an information message in response to the user notification signal, and to perform the urgent recharging operation for the low voltage battery, through the connected car service, when activating the connected car service and controlling to turn on the IGN3 power.

14. A method for controlling a vehicle, the method comprising:

acquiring an SOC of a low voltage battery, acquiring an SOC of a high voltage battery when an IGN3 power is turned off;

comparing the SOC of the high voltage battery with a second threshold value, when the SOC of the low voltage battery is equal to or less than a first threshold value, and a decrement of the low voltage battery exceeds a reference value;

transmitting, to a processor, a signal related to a recharging operation for the low voltage battery based on a comparison result;

waking up the processor, based on the signal related to the recharging operation for the low voltage battery being received; and controlling to perform the recharging operation of the low voltage battery in response to the signal related to the recharging operation for the low voltage battery, which is received when the processor wakes up.

15. The method of claim 14, further comprising:

transmitting, to the processor, a signal for a request for the recharging operation for the low voltage battery, which is included in the signal related to the recharging operation for the low voltage battery, when the SOC of the high voltage battery is equal to or greater than the second threshold value.

16. The method of claim 15, further comprising:

waking up, by the processor, when receiving the signal for request for the recharging operation for the low voltage battery; and controlling to turn on the IGN3 power in response to the signal for request for the recharging operation for the low voltage battery, when waking up.

17. The method of claim 16, further comprising:

controlling, by the processor, to perform the recharging operation for the low voltage battery, when turning on the IGN3 power in response to the signal for request for the recharging operation for the low voltage battery.

18. The method of claim 14, further comprising:

transmitting, to the processor, the signal related to the recharging operation for the low voltage battery depending on the SOC of the low voltage battery, when the SOC of the high voltage battery is less than the second threshold value.

19. The method of claim 18, further comprising:

determining not to transmit, to the processor, a signal for a request for the recharging operation for the low voltage battery, which is included in the signal related to the recharging operation for the low voltage battery, when the SOC of the low voltage battery is in a first range equal to or less than the first threshold value.

20. The method of claim 19, further comprising:

maintaining, by the processor, a sleep state, when failing to receive the signal for the request for the recharging operation for the low voltage battery, which is included in the signal related to the recharging operation for the low voltage battery.

* * * * *